United States Patent
Kakuwa et al.

(10) Patent No.: US 12,074,347 B2
(45) Date of Patent: Aug. 27, 2024

(54) ELECTROCHEMICAL CELL UNIT, ELECTROCHEMICAL CELL STACK, METHOD FOR PRODUCING ELECTROCHEMICAL CELL UNIT, AND METHOD FOR PRODUCING ELECTROCHEMICAL CELL STACK

(71) Applicant: Panasonic Intellectual Property Management Co., Ltd., Osaka (JP)

(72) Inventors: Takashi Kakuwa, Osaka (JP); Hiromi Kita, Nara (JP); Masatoshi Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 423 days.

(21) Appl. No.: 17/511,608

(22) Filed: Oct. 27, 2021

(65) Prior Publication Data

US 2022/0052352 A1    Feb. 17, 2022

Related U.S. Application Data

(63) Continuation of application No. PCT/JP2020/021529, filed on Jun. 1, 2020.

(30) Foreign Application Priority Data

Jun. 13, 2019    (JP) .................................. 2019-109995

(51) Int. Cl.
*H01M 8/00* (2016.01)
*H01M 8/0202* (2016.01)
*H01M 8/1004* (2016.01)

(52) U.S. Cl.
CPC ......... *H01M 8/006* (2013.01); *H01M 8/0202* (2013.01); *H01M 8/1004* (2013.01)

(58) Field of Classification Search
CPC ... H01M 8/0202; H01M 8/006; H01M 8/1004
See application file for complete search history.

(56) References Cited

U.S. PATENT DOCUMENTS

2008/0038621 A1    2/2008    Ichigi et al.
2010/0203414 A1    8/2010    Ooshima et al.

FOREIGN PATENT DOCUMENTS

JP    10-012252    1/1998
JP    2003-282129    10/2003
(Continued)

OTHER PUBLICATIONS

English Translation of Chinese Search Report dated Sep. 4, 2023 for the related Chinese Patent Application No. 202080020737.3.
(Continued)

*Primary Examiner* — Sarah A. Slifka
(74) *Attorney, Agent, or Firm* — Rimon P.C.

(57) ABSTRACT

An electrochemical cell unit according to the present disclosure includes a flat plate type membrane electrode assembly having a structure in which an electrolyte membrane, a first electrode layer disposed on a first surface of the electrolyte membrane, and a second electrode layer disposed on a second surface of the electrolyte membrane are laminated; a first current collector in contact with the first electrode layer of the membrane electrode assembly; an interconnector electrically connected to the first current collector, a second current collector in contact with the second electrode layer of the membrane electrode assembly; and an outer peripheral part made of a metal material that surrounds an outer periphery of the first electrode layer together with the interconnector and the electrolyte membrane to form a gas introduction space for guiding internal gas to the first electrode layer.

19 Claims, 9 Drawing Sheets

(56) References Cited

FOREIGN PATENT DOCUMENTS

| | | |
|---|---|---|
| JP | 2004-319286 A | 11/2004 |
| JP | 4027836 B2 | 12/2007 |
| JP | 2009-277411 | 11/2009 |
| JP | 2011-129309 | 6/2011 |
| JP | 2011-154821 | 8/2011 |
| WO | 2009/041532 | 4/2009 |

OTHER PUBLICATIONS

International Search Report of PCT application No. PCT/JP2020/021529 dated Sep. 1, 2020.
Extended European Search Report dated Jul. 8, 2022 for the related European Patent Application No. 20822667.0.

ELECTROCHEMICAL CELL UNIT, ELECTROCHEMICAL CELL STACK, METHOD FOR PRODUCING ELECTROCHEMICAL CELL UNIT, AND METHOD FOR PRODUCING ELECTROCHEMICAL CELL STACK

BACKGROUND

1. Technical Field

The present disclosure relates to an electrochemical cell unit, an electrochemical cell stack, a method for producing an electrochemical cell unit, and a method for producing an electrochemical cell stack.

2. Description of the Related Art

An example of an electrochemical cell unit is a fuel cell in which a fuel electrode layer is disposed on one surface of a membrane electrode assembly and an air electrode layer is disposed on the other surface of the membrane electrode assembly, and electricity is generated by supplying fuel gas containing hydrogen to the fuel electrode layer and supplying oxidant gas to the air electrode layer. Another example is a hydrogen generation device that generates hydrogen from high-temperature steam by applying a voltage to a membrane electrode assembly.

A fuel cell cannot obtain high power generation output by a single unit cell or a single unit in which members such as a collecting electrode are joined to a unit cell. Therefore, a fuel cell achieves high power generation output by stacking (integrating) a plurality of unit cells or units. Hereinafter, stacked unit cells or units are referred to as a cell stack.

In a case where a shape of units that constitute a cell stack is, for example, a flat plate shape, a load of a predetermined level is applied to the whole cell unit along a direction in which the units are stacked. This can maintain a gas sealing property between the units and reduce electric contact resistance between an electrode layer and a current collector in each unit (see, for example, Japanese Patent No. 5368333 (hereinafter referred to as Patent Literature 1)). In order to realize such a configuration, an expensive large-sized fastening member that can apply a proper load under high temperature is needed.

In view of this, a cylindrical flat plate type cell unit combining a cylindrical type and a flat plate type has been proposed (see, for example, Japanese Patent No. 5119257 (hereinafter referred to as Patent Literature 2) and Japanese Patent No. 4018922 (hereinafter referred to as Patent Literature 3)). According to the cylindrical flat plate type cell unit, it is possible to stack (integrate) a plurality of cylindrical flat plate type units by inserting the plurality of cylindrical flat plate type units into a long-shape manifold for introducing fuel gas. Accordingly, the cylindrical flat plate type cell unit can have a simple structure that does not need application of a fastening load on the stack.

SUMMARY

However, according to the conventional cell units (the cell units disclosed in Patent Literatures 2 and 3), gas leakage of internal gas and breakage of a unit cannot be prevented sufficiently.

One non-limiting and exemplary embodiment provides, as an example, an electrochemical cell unit that can prevent leakage of internal gas and breakage of a unit with a simple configuration.

In one general aspect, the techniques disclosed here feature an electrochemical cell stack including: units each containing: a flat plate type membrane electrode assembly having a structure in which an electrolyte membrane, a first electrode layer disposed on a first surface of the electrolyte membrane, and a second electrode layer disposed on a second surface of the electrolyte membrane are laminated; a first current collector in contact with the first electrode layer of the membrane electrode assembly; an interconnector electrically connected to the first current collector, a second current collector in contact with the second electrode layer of the membrane electrode assembly; and an outer peripheral part made of a metal material that surrounds an outer periphery of the first electrode layer together with the interconnector and the electrolyte membrane to form a gas introduction space for guiding internal gas to the first electrode layer, and an attachment base part having a fixing part made of an electrically insulating member and fixes the units in which the second current collector of a first one of adjacent two of the units and the interconnector of a second one of the adjacent two of the units are electrically connected.

The present disclosure has been configured as above and produces an effect that gas leakage of internal gas and breakage of a unit can be prevented with a simple configuration.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
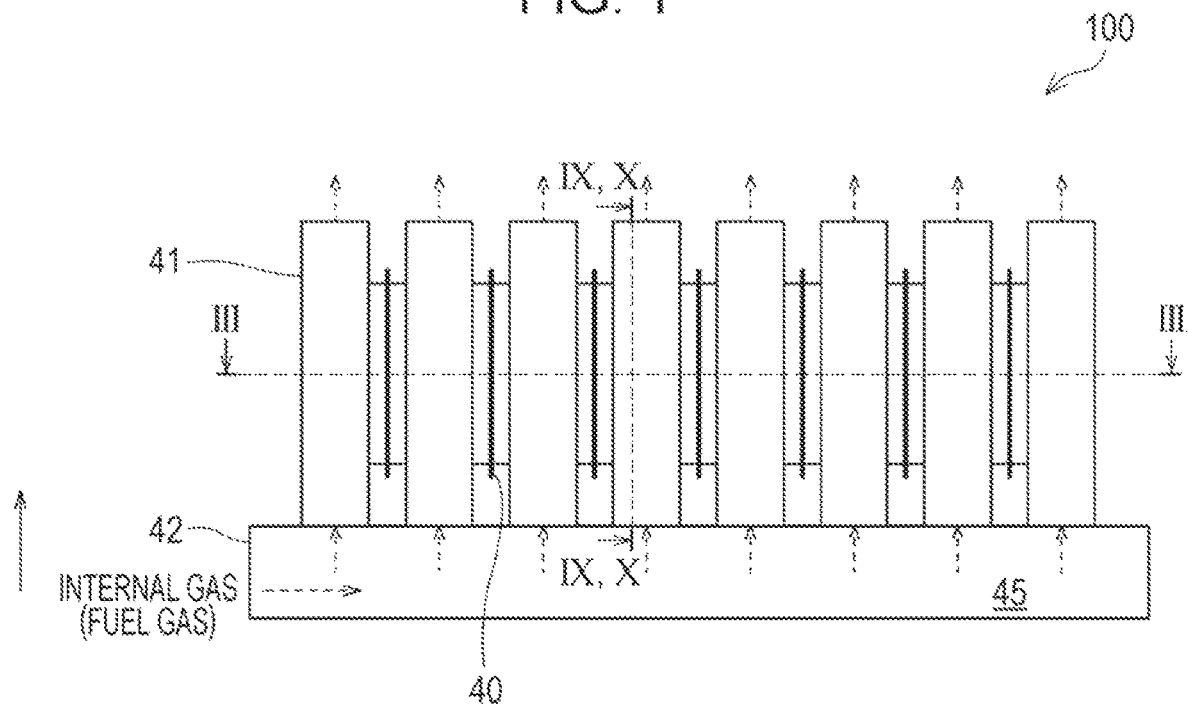
FIG. 1 is a side view illustrating an example of a configuration of an electrochemical cell unit according to an embodiment of the present disclosure.

Underlying Knowledge Forming Basis of the Present Invention

The inventors of the present invention diligently studied the electrochemical cell units disclosed in Patent Literatures 1 to 3. First, in the electrochemical cell according to Patent Literature 1, flat plate type cells are laminated to obtain a stack. A space for a fastening shaft also serves as a gas manifold so that oxidant gas and fuel gas pass along a direction in which the flat plate type cells are laminated. The electrochemical cell unit according to Patent Literature 1 thus needs a mechanism for pressing the flat plate type cells in the laminating direction and needs a configuration for allowing path of oxidant gas and fuel gas. Therefore, the inventors of the present invention found that the electrochemical cell according to Patent Literature 1 has problems in versatility and a reduction in cost.

Meanwhile, the electrochemical cells according to Patent Literatures 2 and 3 are configured such that cylindrical flat plate type units each containing a plurality of gas paths, made of ceramic, and constituted by an inner electrode, a solid electrolyte, and an outer electrode are coupled by a current collecting member with electrically conductive paste interposed therebetween. Ends of the coupled plurality of cylindrical flat plate type units are inserted into a manifold for supplying fuel gas and adhesively sealed, for example, with a glass sealing agent to obtain a stack.

The cell units according to Patent Literatures 2 and 3 do not need a partition plate or the like for preventing leakage of oxidant gas to a fuel electrode side and therefore can have a simple configuration. Especially in Patent Literature 2, a support member having elasticity is disposed on both ends of the stack of the cylindrical flat plate type units, and therefore warpage and the like of ceramic can be absorbed without providing an expensive fastening member.

However, according to the electrochemical cell units according to Patent Literatures 2 and 3, it is necessary to produce a cylindrical flat plate type units having a plurality of gas paths, made of ceramic, and having a special shape constituted by an inner electrode, a solid electrolyte, and an outer electrode. It is therefore impossible to use a versatile flat plate type membrane electrode assembly. The inventors of the present invention found that application and development using a versatile flat plate type membrane electrode assembly is difficult in the electrochemical cell units according to Patent Literatures 2 and 3. Furthermore, the inventors of the present invention found that there are problems in terms of a reduction in cost because application and development are difficult and it is necessary to use a cylindrical flat plate type units having a special shape.

Furthermore, the electrochemical cell units according to Patent Literatures 2 and 3 are configured such that ends of the plurality of cylindrical flat plate type units made of ceramic are inserted into a fuel gas manifold and adhesively sealed, for example, with a glass sealing agent, as described above. The inventors of the present invention found that it is therefore difficult to obtain a configuration that can secure sufficient durability against thermal stress generated due to displacement of the cylindrical flat plate type units resulting from a change in temperature.

Furthermore, the cylindrical flat plate type units are made of ceramic and therefore have lower thermal conductivity and poorer heat releasing performance than a member made of a metal or the like. Accordingly, attempting a further improvement in performance of the electrochemical cell unit by improving a current density or a reduction in size of the electrochemical cell unit causes a problem that heat is trapped in the electrochemical cell unit. The inventors of the present invention found that it is therefore difficult to configure the electrochemical cell units according to Patent Literatures 2 and 3 so that an improvement in performance and a reduction in size thereof are achieved.

As a result of diligent studies, the inventors of the present invention obtained the following findings concerning these problems. First, for example, a fuel electrode (first electrode layer) of a flat plate type cell (membrane electrode assembly) made of ceramic is surrounded by an outer peripheral part made of a metal to form a gas introduction space for guiding internal gas (e.g., fuel gas containing hydrogen). This configuration can prevent gas leakage of the internal gas. Furthermore, it is possible to prevent oxidant gas supplied to an air electrode (second electrode layer) side from leaking out to the first electrode layer side. Furthermore, the inventors of the present invention found that since the outer peripheral part is formed from a thin metal material, even when the membrane electrode assembly is displaced due to a change in temperature, influence of the displacement can be absorbed by warping of the outer peripheral part, and therefore breakage of the membrane electrode assembly can be prevented.

Furthermore, the inventors of the present invention found that it is possible to prevent short circuit of a plurality of units by coupling adjacent units with a current collector interposed therebetween and fixing the plurality of units to an attachment base part with a fixing part made of an electrically insulating member interposed therebetween. Furthermore, the inventors of the present invention found that the configuration can be made simple since a fastening mechanism for pressing is unnecessary unlike a conventional flat plate type unit structure having a flat plate type membrane electrode assembly. The present disclosure provides the following aspects.

An electrochemical cell stack according to a first aspect of the present disclosure includes units each containing: a flat plate type membrane electrode assembly having a structure in which an electrolyte membrane, a first electrode layer disposed on a first surface of the electrolyte membrane, and a second electrode layer disposed on a second surface of the electrolyte membrane are laminated; a first current collector in contact with the first electrode layer of the membrane electrode assembly; an interconnector electrically connected to the first current collector, a second current collector in contact with the second electrode layer of the membrane electrode assembly; and an outer peripheral part made of a metal material that surrounds an outer periphery of the first electrode layer together with the interconnector and the electrolyte membrane to form a gas introduction space for guiding internal gas to the first electrode layer, and an attachment base part having a fixing part made of an electrically insulating member and fixes the units in which the second current collector of a first one of adjacent two of the units and the interconnector of a second one of the adjacent two of the units are electrically connected.

According to the configuration, the plurality of units are fixed by the attachment base part made of an electrically insulating member. Since the units are electrically insulated by the attachment base part, it is possible to prevent short circuit between the units. Furthermore, the configuration can be made simple since a fastening mechanism for pressing is unnecessary unlike a conventional flat plate type unit structure having a flat plate type membrane electrode assembly.

Furthermore, it is possible to prevent gas leakage of internal gas since a gas introduction space is formed by the interconnector, the electrolyte membrane, and the outer peripheral part made of a metal material. Furthermore, even in a case where the membrane electrode assembly is displaced due to exposure of the units to a high temperature, stress caused by this displacement can be absorbed since the outer peripheral part is made of a thin metal material and can be warped. It is therefore possible to prevent occurrence of breakage of the membrane electrode assembly in each of the units.

Therefore, the electrochemical cell unit according to the first aspect of the present disclosure produces an effect that it is possible to prevent gas leakage of internal gas and breakage of the units with a simple configuration.

In the first aspect, the electrochemical cell stack according to a second aspect of the present disclosure may be configured such that the outer peripheral part has an inlet part through which the internal gas flows into the gas introduction space and an outlet part through which internal gas used for an electrochemical reaction of the membrane electrode assembly is discharged from the gas introduction space; and the attachment base part has a gas supply path that is communicated with the gas introduction space through the inlet part and supplies the internal gas to the gas introduction space.

According to the configuration, in which the attachment base part includes a gas supply path, it is unnecessary to provide a gas supply path separately from the attachment base part. This makes it possible to reduce a size of the device configuration.

In the first aspect or the second aspect, the electrochemical cell stack according to a third aspect of the present disclosure may be configured such that the electrically insulating member is a ceramic member.

According to the configuration, the attachment base part is made of a ceramic member and can therefore have heat resistance and electric insulation. This makes it possible to prevent short circuit between the units fixed by the attachment base part.

In the second or third aspect, the electrochemical cell stack according to a fourth aspect of the present disclosure may further include a gas collecting part that collects the internal gas discharged from the gas introduction space through the outlet part.

According to the configuration, the electrochemical cell stack includes a gas collecting part, and therefore all internal gas discharged from the gas introduction space through the outlet part can be collected from the units and made even by mixing.

As a utilization rate of internal gas by the electrochemical reaction improves, a concentration of flammable gas such as hydrogen gas contained in the internal gas decreases. Furthermore, there occurs a difference in concentration of flammable gas contained in internal gas discharged from the outlet parts of the units due to a difference in utilization rate of the internal gas in the units.

For example, a configuration in which discharged internal gas is combusted in a combustion part can be assumed. In such a configuration, in a case where internal gas discharged from the outlet parts of the units is combusted as it is in the combustion part, if there is internal gas in which a concentration of flammable gas has decreased to such a degree that combustion in the combustion part is hindered, this internal gas is not combusted, and therefore a partial misfire occurs.

However, according to the electrochemical cell stack according to the fourth aspect of the present disclosure, the gas collecting part can make a concentration of flammable gas even by mixing the discharged internal gas. It is therefore possible to prevent occurrence of a partial misfire.

In any one of the second through fourth aspects, the electrochemical cell stack according to a fifth aspect of the present disclosure may be configured such that the inlet part and the outlet part of the outer peripheral part are provided symmetrically with respect to the membrane electrode assembly when the units are viewed in plan view in a direction in which the units are laminated.

According to the configuration, internal gas can be efficiently supplied to the first electrode layer of the membrane electrode assembly in the gas introduction space.

The state of being provided symmetrically with respect to the membrane electrode assembly may be a state of being provided symmetrically with respect to a center of the membrane electrode assembly.

In the fifth aspect, the electrochemical cell stack according to a sixth aspect of the present disclosure may be configured such that the membrane electrode assembly has a circular shape.

According to the configuration, the membrane electrode assembly has a circular shape, and therefore can have increased strength, for example, as compared with a membrane electrode assembly having a rectangular shape.

In any one of the second through sixth aspects, the electrochemical cell stack according to a seventh aspect of the present disclosure may be configured such that opening width dimensions of the inlet part and the outlet part are within a range of a projection width of the membrane electrode assembly in a direction in which the internal gas flows.

According to the configuration, internal gas can be supplied to the first electrode layer of the membrane electrode assembly more evenly irrespective of a shape (e.g., a circular shape, a rectangular shape) of the membrane electrode assembly than a configuration in which opening width dimensions of the inlet part and the outlet part are equal to or larger than the projection width of the membrane electrode assembly in a direction in which the internal gas flows.

In any one of the first through seventh aspects, the electrochemical cell stack according to an eighth aspects of the present disclosure may be configured such that the outer peripheral part is joined to the electrolyte membrane with any one selected from the group consisting of glass, ceramics, and silver solder interposed therebetween.

According to the configuration, the internal gas can be sealed so as not to flow out from the gas introduction space.

Furthermore, even in a case where the units are exposed to a high temperature, the units can have a strength withstanding the high temperature.

Furthermore, even in a case where the membrane electrode assembly contracts and expands due to a change in temperature, stress caused by the displacement of the membrane electrode assembly can be absorbed by the outer peripheral part since the electrolyte membrane is joined to the outer peripheral part with any one of glass, ceramics, and silver solder interposed therebetween.

In any one of the first through eighth aspects, the electrochemical cell stack according to a ninth aspect of the present disclosure may be configured such that the metal material of which the outer peripheral part is made is stainless steel.

According to the configuration, the metal material of which the outer peripheral part is made is stainless steel, and therefore even in a case where the units are exposed under a high temperature, the outer peripheral part can have sufficient oxidation resistance and strength. Furthermore, the outer peripheral part can have a coefficient of thermal expansion closer to ceramic of which the membrane electrode assembly is mainly made. It is therefore possible to minimize occurrence of thermal stress and the like in a joint part between the outer peripheral part and the electrolyte membrane.

An electrochemical cell unit according to a tenth aspect of the present disclosure includes a flat plate type membrane electrode assembly having a structure in which an electrolyte membrane, a first electrode layer disposed on a first surface of the electrolyte membrane, and a second electrode layer disposed on a second surface of the electrolyte membrane are laminated; a first current collector in contact with the first electrode layer of the membrane electrode assembly; an interconnector electrically connected to the first current collector, a second current collector in contact with the second electrode layer of the membrane electrode assembly; and an outer peripheral part made of a metal material that surrounds an outer periphery of the first electrode layer together with the interconnector and the electrolyte membrane to form a gas introduction space for guiding internal gas to the first electrode layer.

In the tenth aspect, the electrochemical cell unit according to an eleventh aspect of the present disclosure is configured such that the outer peripheral part has an inlet part through which the internal gas flows into the gas introduction space and an outlet part through which internal gas used for an electrochemical reaction of the membrane electrode assembly is discharged from the gas introduction space.

In the eleventh aspect, the electrochemical cell unit according to a twelfth aspect of the present disclosure is configured such that the inlet part and the outlet part of the outer peripheral part are provided symmetrically with respect to the membrane electrode assembly when the units are viewed in plan view in a direction in which the units are laminated.

In any one of the tenth through twelfth aspects, the electrochemical cell unit according to a thirteenth aspect of the present disclosure is configured such that the membrane electrode assembly has a circular shape.

In the eleventh aspect, the electrochemical cell unit according to a fourteenth aspect of the present disclosure is configured such that opening width dimensions of the inlet part and the outlet part are within a range of a projection width of the membrane electrode assembly in a direction in which the internal gas flows.

In any one of the tenth through fourteenth aspects, the electrochemical cell unit according to a fifteenth aspect of the present disclosure is configured such that the outer peripheral part is joined to the electrolyte membrane with any one selected from the group consisting of glass, ceramics, and silver solder interposed therebetween.

A method for producing an electrochemical cell unit according to a sixteenth aspect of the present disclosure is a method for producing an electrochemical cell unit including a flat plate type membrane electrode assembly having a structure in which an electrolyte membrane, a first electrode layer disposed on a first surface of the electrolyte membrane, and a second electrode layer disposed on a second surface of the electrolyte membrane are laminated; a first current collector in contact with the first electrode layer of the membrane electrode assembly; an interconnector electrically connected to the first current collector, a second current collector in contact with the second electrode layer of the membrane electrode assembly; and an outer peripheral part made of a metal material that surrounds an outer periphery of the first electrode layer together with the interconnector and the electrolyte membrane to form a gas introduction space for guiding internal gas to the first electrode layer. The method including applying first paste, which is any one selected from the group consisting of a glass sealing agent, a ceramic adhesive, and a silver soldering agent, to a first joint part where the outer peripheral part and a surface of the electrolyte membrane that faces the second electrode layer are joined; applying second paste having electric conductivity to a second joint part where a surface of the second electrode layer on which the second current collector is provided and the second current collector are joined; joining the outer peripheral part and the electrolyte membrane in the first joint part by application of pressure; joining the second electrode layer and the second current collector in the second joint part by application of pressure; and heat-treating the first joint part and the second joint part together at 800° C. to 900° C. to form the units.

According to the method, the first joint part and the second joint part can be heat-treated together in the third step, and therefore the step can be shortened as compared with a method in which the first joint part and the second joint part are heat-treated separately. Furthermore, it is possible to prevent a problem that in a case where different pastes are heat-treated in different steps, paste heat-treated in an earner step melts again when different paste is heat-treated in a later step.

A method for producing an electrochemical cell stack according to a seventeenth aspect of the present disclosure includes applying first paste, which is any one selected from the group consisting of a glass sealing agent, a ceramic adhesive, and a silver soldering agent, to a first joint part where the outer peripheral part and a surface of the electrolyte membrane that faces the second electrode layer are joined; applying second paste having electric conductivity to a second joint part where a surface of the second electrode layer on which the second current collector is provided and the second current collector are joined; joining the outer peripheral part and the electrolyte membrane in the first joint part by application of pressure; joining the second electrode layer and the second current collector in the second joint part by application of pressure; heat-treating the first joint part and the second joint part together at 800° C. to 900° C. to form the units; applying a glass sealing agent or a ceramic adhesive to a third joint part where the units formed in the heat-treating and the attachment base part are joined; and heat-treating the third joint part at a temperature lower than the temperature for the heat treatment in the heat-treating.

According to the method, a temperature at which the third joint part is heat-treated in the fifth step is lower than a temperature at which the first joint part and the second joint part are heat-treated in the earlier third step. This can keep the first paste for the first joint part and the second paste for the second joint part from melting again when the third joint part is heat-treated. It is therefore possible to perform the joining process in the first to third joint parts with certainty.

An embodiment of the present disclosure is described below with reference to the drawings. Note that identical or corresponding constituent elements are given identical reference signs throughout all drawings, and description thereof may be omitted.

Embodiment

An electrochemical cell stack 100 according to an embodiment of the present disclosure is a cell stack including a flat plate type membrane electrode assembly 34 in which an electrolyte membrane 32, a first electrode layer 31 disposed on one surface of the electrolyte membrane 32, and a second electrode layer 33 disposed on the other surface of the electrolyte membrane 32 are laminated. The embodiment of the present disclosure describes, as an example, a configuration of a solid oxide fuel cell including the membrane electrode assembly 34 having a flat plate rectangular shape. However, the electrochemical cell stack 100 is not limited to a solid oxide fuel cell and may be a water electrolysis stack that produces hydrogen and others from high-temperature steam by applying a voltage to the membrane electrode assembly 34. Furthermore, a shape of the membrane electrode assembly 34 of the electrochemical cell stack 100 is not limited to a flat plate rectangular shape and may be, for example, a flat plate circular shape.

Figure 2:
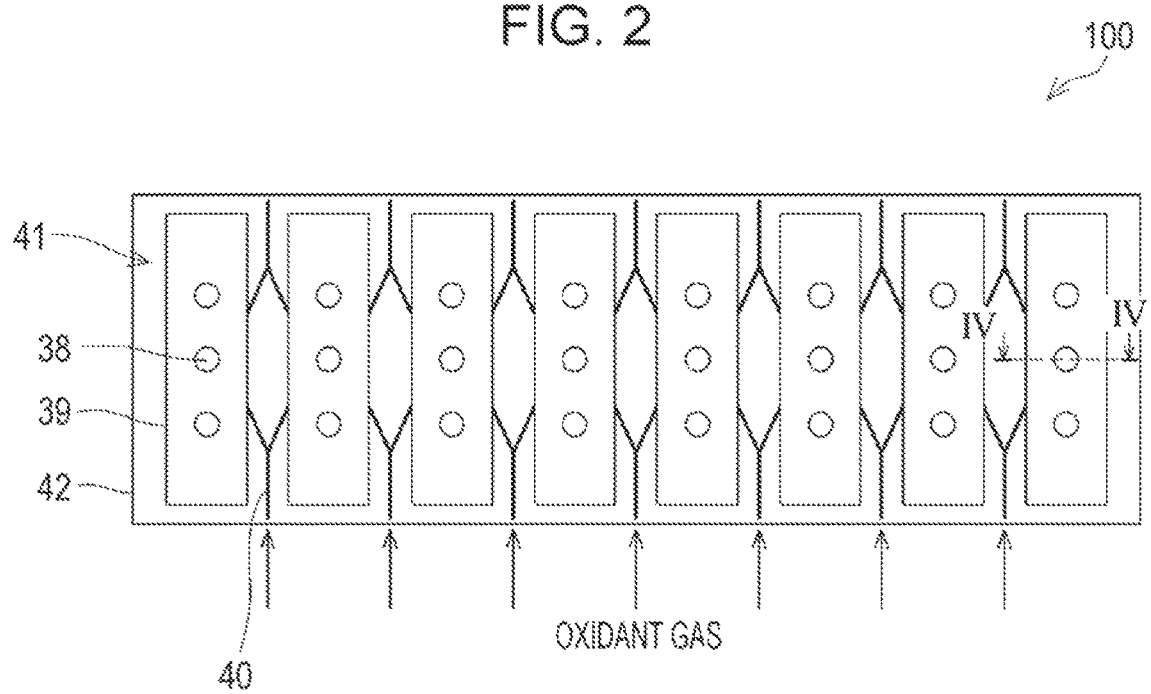
FIG. 2 is a plan view illustrating an example of the configuration of the electrochemical cell unit illustrated in FIG. 1.
Figure 3:
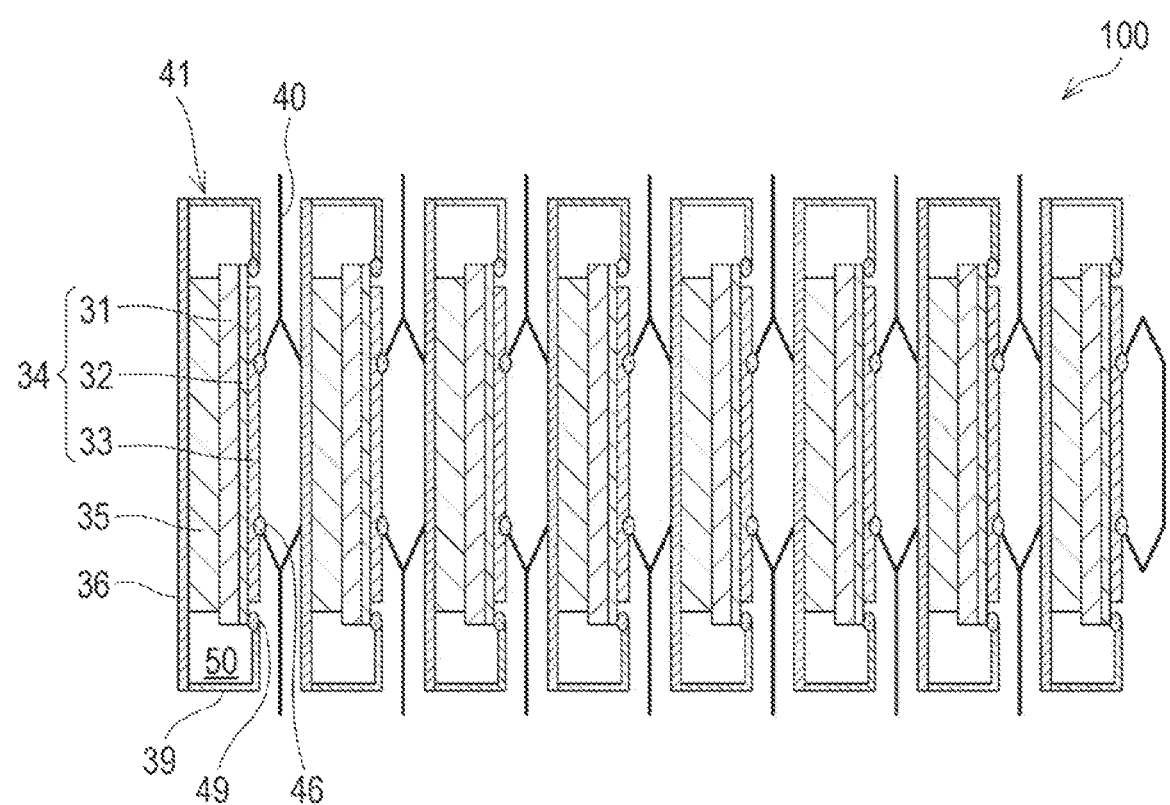
FIG. 3 is a cross-sectional view of the electrochemical cell unit illustrated in FIG. 1 taken along line III-III.
Figure 4:
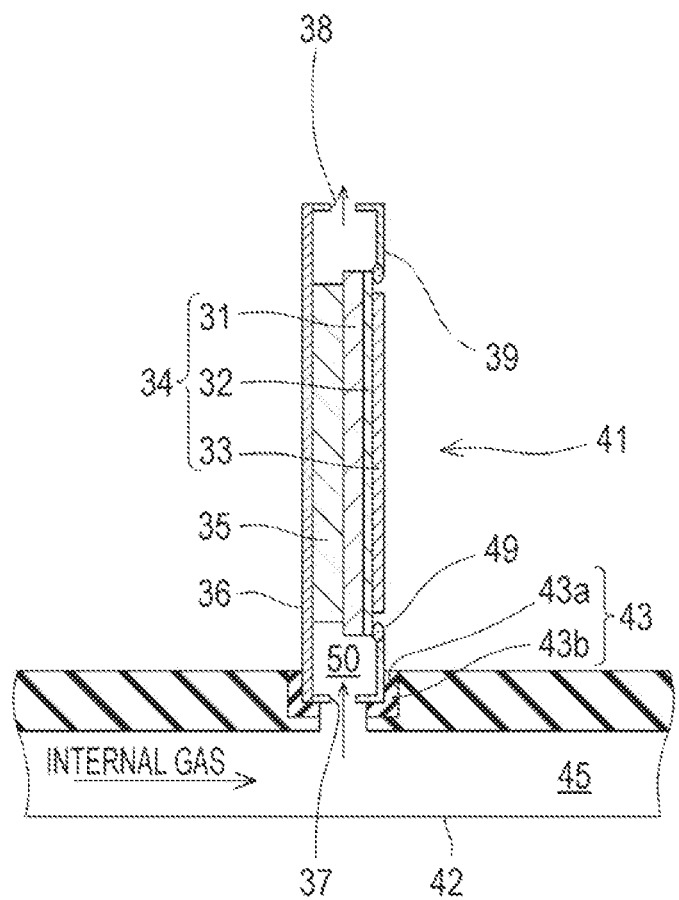
FIG. 4 is a cross-sectional view of a unit provided in the electrochemical cell unit illustrated in FIG. 2 taken along line IV-IV.

A configuration of the electrochemical cell stack 100 according to the embodiment of the present disclosure is described below with reference to FIGS. 1 through 4. FIG. 1 is a side view illustrating an example of a configuration of the electrochemical cell stack 100 according to the embodiment of the present disclosure. FIG. 2 is a plan view illustrating an example of the configuration of the electrochemical cell stack 100 illustrated in FIG. 1. FIG. 3 is a cross-sectional view of the electrochemical cell stack 100 illustrated in FIG. 1 taken along line III-III. FIG. 4 is a cross-sectional view of an electrochemical cell unit 41 provided in the electrochemical cell stack 100 illustrated in FIG. 2 taken along line IV-IV.

In FIG. 1, the broken-line arrows indicate flow of internal gas (e.g., fuel gas). In FIG. 2, the solid-line arrows indicate flow of oxidant gas. In FIG. 3, only a cross-sectional shape of a plurality of coupled electrochemical cell units 41 taken along line III-III is illustrated. In FIG. 4, a cross-sectional shape of any one electrochemical cell unit 41 taken along line IV-IV is illustrated.

As illustrated in FIGS. 1 and 2, the electrochemical cell stack 100 includes the electrochemical cell units 41 and an attachment base part 42. Furthermore, as illustrated in FIG. 3, each of the electrochemical cell units 41 has, in addition to the membrane electrode assembly 34, a first current collector 35 that is in contact with the first electrode layer 31 of the membrane electrode assembly 34, an interconnector 36 electrically connected to the first current collector 35, a second current collector 40 that is in contact with the second electrode layer 33 of the membrane electrode assembly 34, and an outer peripheral part 39 that is made of a metal material and surrounds an outer periphery of the first electrode layer 31 together with the interconnector 36 and the electrolyte membrane 32 so as to form a gas introduction space 50 for guiding the internal gas to the first electrode layer 31.

More specifically, as illustrated in FIG. 3, each of the electrochemical cell units 41 has a flat plate rectangular shape such that one surface in a laminating direction is the interconnector 36 made of a metal, the second electrode layer 33 that is in contact with the electrolyte membrane 32 is exposed on the other surface, and a side periphery of the electrochemical cell unit 41 is surrounded by the outer peripheral part 39 made of a metal. The state where the interconnector 36 is electrically connected to the first current collector 35 is, for example, a state where the first current collector 35 and the interconnector 36 are in contact with each other.

Membrane Electrode Assembly

The membrane electrode assembly 34 includes the electrolyte membrane 32, the first electrode layer 31, and the second electrode layer 33. The electrolyte membrane 32 included in the membrane electrode assembly 34 may be made of YSZ-based ceramic that transmits oxygen ions. Alternatively, the electrolyte membrane 32 may be made of yttrium-doped barium zirconate (BZY) or ytterbium-doped barium zirconate (BZYb) ceramic that transmits protons. That is, the membrane electrode assembly 34 may be an oxide ion type in which oxide ions pass through the electrolyte membrane 32 or may be a proton type in which hydrogen ions pass through the electrolyte membrane 32.

In a case where the electrochemical cell stack 100 is used as a solid oxide fuel cell, an operating temperature is approximately 600° C. to 800° C. In particular, in a case where an electrolyte membrane having proton conductivity is used as the electrolyte membrane 32, the operating temperature of the solid oxide fuel cell can be lowered to approximately 696° C.

The first electrode layer 31 included in the membrane electrode assembly 34 functions as a fuel electrode in the solid oxide fuel cell. The first electrode layer 31 may be made of a metal such as Pt, Au, Ag, Pb, Ir, Ru, Rh, Ni, or Fe and ceramic. The first electrode layer 31 may be made of only one kind of metal among these metals or may be made of an alloy containing two or more kinds of metals among these metals.

Meanwhile, the second electrode layer 33 included in the membrane electrode assembly 34 functions as an air electrode in the solid oxide fuel cell. The second electrode layer 33 may be made of any one selected from the group consisting of a lanthanum strontium cobalt composite oxide (LSC), a lanthanum strontium cobalt ferrite composite oxide (LSCF), and a lanthanum strontium ferrite composite oxide (LSF).

In the electrochemical cell stack 100 according to the embodiment, fuel gas is supplied as the internal gas to the first electrode layer 31 and oxidant gas is supplied to the second electrode layer 33, and thus power is generated in the membrane electrode assembly 34.

The internal gas may be, for example, high-temperature gas containing hydrogen generated from raw material gas by a reforming reaction in a reformer. The raw material gas is, for example, hydrocarbon gas such as city gas or propane gas. Alternatively, the raw material gas may be natural gas, naphtha, coal gasification gas, or the like. Alternatively, the raw material gas may be hydrogen gas or mixture gas of hydrogen gas and hydrocarbon gas. As the raw material gas, one kind of gas may be used or a mixture or combination of plural kinds of gas may be used. Furthermore, the raw material gas may contain inert gas such as nitrogen or argon. Alternatively, gas obtained by gasifying a solid or liquid raw material may be used as the raw material gas or hydrogen gas generated by reforming gas other than the hydrocarbon gas described above may be used as the raw material gas. Meanwhile, the oxidant gas is preferably air, which is safe and inexpensive, but may be mixture gas of oxygen and other gas.

The internal gas is supplied to a gas supply path 45 provided in the attachment base part 42 through a gas pipe (not illustrated) disposed outside the electrochemical cell stack 100. Then, the internal gas is evenly distributed to the electrochemical cell units 41 in the gas supply path 45 and introduced into the gas introduction spaces 50 provided in the outer peripheral parts 39 of the respective electrochemical cell units 41. Meanwhile, the oxidant gas flows in a direction orthogonal to a direction in which the internal gas flows as illustrated in FIG. 2 and is supplied to the second electrode layer 33

A shape of the membrane electrode assembly 34 is not limited to a quadrangular flat plate and may be a circular flat plate, a polygonal flat plate, or the like. In this case, a cutout shape of the outer peripheral part 39 is adjusted to fit the shape of the membrane electrode assembly 34, and the shapes of the first current collector 35 and the second current collector 40 are changed.

Furthermore, in the electrochemical cell stack 100, shapes and kinds of the membrane electrode assemblies 34 incorporated in the plurality of coupled electrochemical cell units 41 may be the same or may be different. The electrochemical cell stack 100 can be produced at low cost by selecting optimum one as the membrane electrode assembly 34.

First Current Collector/Second Current Collector

The first current collector 35 and the second current collector 40 collect electricity from surfaces of the first electrode layer 31 and the second electrode layer 33. The first current collector 35 electrically connects the first electrode layer 31 and the interconnector 36, and the second current collector 40 electrically connects the second electrode layer 33 and the interconnector 36 of an adjacent electrochemical cell unit 41.

The first current collector 35 that electrically connects the first electrode layer 31 and the interconnector 36 is mainly made of nickel steel since the first electrode layer 31 side is reducing atmosphere. Meanwhile, the second current collector 40 that electrically connects the second electrode layer 33 and the interconnector 36 of an adjacent electrochemical cell unit 41 is mainly made of ferritic stainless steel excellent in oxidation resistance since the second electrode layer 33 side is high-temperature oxidizing atmosphere.

In each of the electrochemical cell units 41, the first current collector 35 that is in contact with the interconnector 36 may be a nickel plate provided with a plurality of cut and raised parts. That is, the first current collector 35 may be configured such that a current collector base material that is a nickel plate in contact with the interconnector 36 and a plurality of cut and raised parts 60 (see FIG. 9, which will be described later) raised from the current collector base material toward the first electrode layer 31 by cutting and raising processing are disposed in contact with the first electrode layer 31. In a case where the first current collector 35 is configured in this way, an electric contact between the first electrode layer 31 and the interconnector 36 can be secured, and the first current collector 35 can follow displacement of the membrane electrode assembly 34 due to elasticity of the cut and raised parts 60. Furthermore, the cut and raised parts 60 can improve diffusivity of the internal gas in the first electrode layer 31.

Furthermore, in each of the electrochemical cell units 41, the second electrode layer 33 and the second current collector 40 are joined by second paste 46 having electric conductivity. The second paste 46 is paste that has sufficiently small electric resistance at a contact point even under a high-temperature environment. The second current collector 40 is joined, at an end thereof different from an end joined to the second electrode layer 33, to the interconnector 36 of an adjacent electrochemical cell unit 41, for example, by welding or swaging so as to be electrically connected to the interconnector 36. In this way, adjacent electrochemical cell units 41 are coupled with the second current collector 40 interposed therebetween so as to be electrically connected to each other. The second current collector 40 may have a pantograph shape (see FIGS. 2 and 3) so as to be deformable. However, the second current collector 40 is not limited to such a shape, and may be provided with a plurality of cut and raised parts as with the first current collector 35. Alternatively, the second current collector 40 may be formed by dimples, a metal mesh, metal form, or the like.

Interconnector

The interconnector 36 is a member that electrically connects the electrochemical cell units 41 and collects power generated in the electrochemical cell unit 41. Power generated in the electrochemical cell unit 41 is supplied to the interconnector 36 through the first current collector 35 and the second current collector 40. The interconnector 36 can be, for example, a plate member made of ferritic stainless and having a thickness of 0.2 mm to 2.0 mm.

Note that a current collecting member (not illustrated) that has an output terminal is provided at both ends of a group of the electrochemical cell units 41 coupled in series, that is, at both ends of the electrochemical cell stack 100. The current collecting member may be a current collecting plate or may be a current collecting wire. In a case where the electrochemical cell stack 100 is used as a cell unit of a solid oxide fuel cell, electricity generated in each electrochemical cell unit 41 is taken out from the current collecting member at both ends of the electrochemical cell stack 100 and is used as power.

Outer Peripheral Part

As illustrated in FIG. 3, the outer peripheral part 39 is joined, at one end thereof, to the electrolyte membrane 32 of the membrane electrode assembly 34 with use of first paste 49 with an overlapping width of approximately 2 mm to 10 mm, and the whole periphery of the outer peripheral part 39 is welded to the interconnector 36 at the other end thereof. Note that joining the outer peripheral part 39 and the interconnector 36 by metal welding is advantageous in that higher durability is obtained than a case where a ceramic member is joined by heat treatment.

As described above, the outer peripheral part 39 can surround the outer peripheries of the first electrode layer 31 and the first current collector 35 together with the interconnector 36 and the electrolyte membrane 32. According to this configuration, the gas introduction space 50 for guiding the internal gas to the first electrode layer 31 can be formed in each of the electrochemical cell units 41. Note that the outer peripheral part 39 can be, for example, made of thin ferritic stainless steel (for example, thickness t=0.05 mm to 0.15 mm).

In a case where the outer peripheral part 39 is made of ferritic stainless steel as described above, a material cost for producing the electrochemical cell units 41 can be made low. Furthermore, even in a case where the electrochemical cell units 41 are exposed to a high temperature during power generation, the outer peripheral part 39 can have sufficient oxidation resistance and strength. Furthermore, the outer peripheral part 39 can have a coefficient of thermal expansion closer to ceramic of which the membrane electrode assembly 34 is mainly made. This can minimize occurrence of thermal stress or the like at a joint portion between the outer peripheral part 39 and the electrolyte membrane 32 and in the membrane electrode assembly 34.

The first paste 49 may be any one selected from the group consisting of glass, ceramic, and silver solder. Since the outer peripheral part 39 is joined to the electrolyte membrane 32 by such first paste 49, the internal gas can be sealed so as not to flow out of the gas introduction space 50. Furthermore, even in a case where the electrochemical cell units 41 are exposed to a high temperature, the electrochemical cell units 41 can have a strength withstanding the high temperature. Furthermore, even in a case where the membrane electrode assembly 34 contracts or expands due to a change in temperature, stress caused by the displacement of the membrane electrode assembly 34 can be absorbed by the outer peripheral part 39 since the electrolyte membrane 32 is joined to the outer peripheral part 39 with any one selected from the group consisting of glass, ceramic, and silver solder interposed therebetween. This can suppress occurrence of breakage and peeling of the membrane electrode assembly 34.

The outer peripheral part 39 has an inlet part 37 at an end of each electrochemical cell unit 41 attached to the attachment base part 42 and has an outlet part 38 at an end of each electrochemical cell unit 41 opposite to the side where the inlet part 37 is provided. The gas supply path 45 provided in the attachment base part 42 and the gas introduction space 50 are communicated through the inlet part 37.

Figure 5:
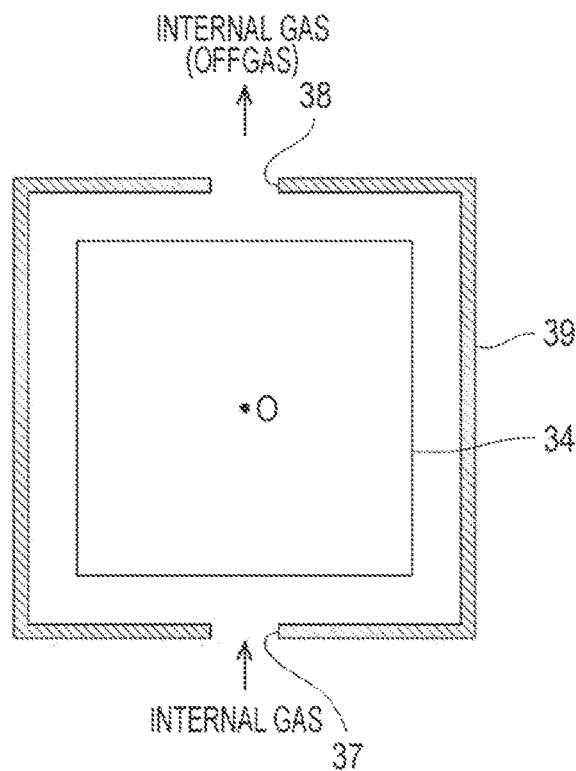
FIG. 5 schematically illustrates a positional relationship between an outer peripheral part and a membrane electrode assembly when units provided in the electrochemical cell unit according to the present disclosure are viewed in a direction in which the units are laminated.

As illustrated in FIG. 5, the inlet part 37 and the outlet part 38 of the outer peripheral part 39 are provided symmetrically with respect to the membrane electrode assembly 34, especially with respect to a center 0 of the membrane electrode assembly 34 when viewed in plan view in a direction in which the electrochemical cell units 41 are laminated. FIG. 5 schematically illustrates a positional relationship between the outer peripheral part 39 and the membrane electrode assembly 34 when the electrochemical cell units 41 of the electrochemical cell stack 100 according to the present disclosure are viewed from the laminating direction. In a case where the inlet part 37 and the outlet part 38 are provided in the positional relationship illustrated in FIG. 5 in the outer peripheral part 39, the internal gas can be efficiently supplied to the first electrode layer 31 of the membrane electrode assembly 34 in the gas introduction space 50.

Furthermore, opening width dimensions of the inlet part 37 and the outlet part 38 obtained when the electrochemical cell units 41 are viewed in plan view in the laminating direction are set so as to be within a range of a projection width of the membrane electrode assembly 34 in the direction in which the internal gas flows. Accordingly, irrespective of whether the membrane electrode assembly 34 has a flat plate rectangular shape or a flat plate circular shape as described above, the internal gas can be evenly supplied to the first electrode layer 31. Details of the relationship between the opening width dimensions of the inlet part 37 and the outlet part 38 and the projection width of the membrane electrode assembly 34 in the direction in which the internal gas flows will be described later.

In this way, the outer peripheral part 39 surrounds an outer periphery of the first electrode layer 31 together with the interconnector 36 and the electrolyte membrane 32 to form the gas introduction space 50, and therefore the internal gas does not leak from portions other than the inlet part 37 and the outlet part 38. This can prevent gas leakage of the internal gas. Even if the gas leaks from the gas introduction space 50, a position from which the gas leaks can be more easily specified and repaired than a configuration in which a gas introduction space is formed by ceramic.

Furthermore, even in a case where the membrane electrode assembly 34 is displaced due to exposure of the electrochemical cell units 41 to a high temperature, stress caused by this displacement can be absorbed since the outer peripheral part 39 is formed from a thin metal material and therefore can be warped. It is therefore possible to prevent occurrence of breakage of the membrane electrode assembly 34 in each of the electrochemical cell units 41.

(Attachment Base Part)

As illustrated in FIGS. 1 and 4, the attachment base part 42 has a fixing part 43 that is made of an electrically insulating member and fixes the plurality of electrochemical cell units 41 in a state in which the second current collector 40 of one of adjacent electrochemical cell units 41 and the interconnector 36 of the other one of the adjacent electrochemical cell units 41 are electrically connected to each other. Furthermore, the attachment base part 42 has the gas supply path 45 that is communicated with the gas introduction space 50 formed by the outer peripheral part 39 and supplies the internal gas (e.g., fuel gas) to the gas introduction space 50.

That is, the electrochemical cell stack 100 is configured such that the plurality of electrochemical cell units 41 are coupled in the laminating direction and ends of the electrochemical cell units 41 are fixedly inserted into the fixing parts 43 of the attachment base part 42 for supplying the internal gas. The fixing part 43 is constituted by a slit-shaped insertion part 43*a* formed in the attachment base part 42 and a seal joining part 43*b* that joins an end of the electrochemical cell unit 41 inserted into the insertion part 43*a* to the attachment base part 42. That is, the insertion part 43*a* is a slit-shaped gap having a shape according to the cross-sectional shape of the electrochemical cell unit 41 taken along line III-III, and an end of the electrochemical cell unit 41 is inserted into this gap and a contact surface between the electrochemical cell unit 41 and the attachment base part 42 is fixed by the seal joining part 43*b*. Note that at least a surface of the insertion part 43*a* that makes contact with the electrochemical cell unit 41 and the seal joining part 43*b* are made of an electrically insulating member.

That is, the attachment base part 42 directly makes contact with the electrochemical cell units 41 having different voltages and is therefore required to be electrically insulating. In the electrochemical cell stack 100 according to the embodiment, at least the surface of the insertion part 43*a* that makes contact with the electrochemical cell unit 41 is made of an insulating member such as ceramic. Examples of the seal joining part 43*b* include a glass sealing agent and a ceramic adhesive, which can achieve both electric insulation between the attachment base part 42 and the electrochemical cell unit 41 and gas sealing. Note that although at least the surface of the insertion part 43a that makes contact with the electrochemical cell unit 41 among elements of the attachment base part 42 is made of an electrically insulating member such as ceramic in the electrochemical cell stack 100 according to the embodiment, the whole attachment base part 42 may be made of an electrically insulating member.

The internal gas passing the gas supply path 45 of the attachment base part 42 is supplied from the attachment base part 42 to the electrochemical cell units 41 through the inlet parts 37 for the internal gas provided in the outer peripheral parts 39 of the electrochemical cell units 41. When the internal gas passes the gas introduction space 50 of each of the electrochemical cell units 41, hydrogen contained in the internal gas is consumed on a surface of the first electrode layer 31 due to an electrochemical reaction. The internal gas whose hydrogen has been consumed is discharged to an outside of each of the electrochemical cell units 41 through the outlet part 38.

Note that the number of electrochemical cell units 41 coupled and fixed to the attachment base part 42 can be changed depending on a necessary power generation amount. That is, the electrochemical cell units 41 may be disposed in a single line as illustrated in FIGS. 1 and 2 or may be disposed in two or more lines.

Furthermore, the number of electrochemical cell units 41 fixed on the attachment base part 42 and coupled to one another changes depending on a power generation amount necessary in a solid oxide fuel cell or the like and an electrode area, a current density, and the like of the membrane electrode assembly 34. For example, in a case where the solid oxide fuel cell is a household power generation device, the number of coupled electrochemical cell units 41 and an area of an electrode layer of each of the electrochemical cell units 41 are decided so that approximately DC780 W (approximately AC700 W) is obtained.

In a case where main surfaces of the first electrode layer 31 and the second electrode layer 33 of the membrane electrode assembly 34 mounted in each of the electrochemical cell units 41 are squares that are approximately 100 mm on a side, for example, 15 to 40 electrochemical cell units 41 are coupled. Since an electromotive voltage of each of the electrochemical cell units 41 is approximately 0.8V, an electromotive voltage of approximately 12V to 32V and a large direct current of 20 A to 30 A can be obtained by coupling the electrochemical cell units 41 in series. In a case of a product for large equipment, the number of coupled electrochemical cell units 41 may be larger.

As described above, the internal gas supplied to each of the electrochemical cell units 41 through the gas supply path 45 of the attachment base part 42 is guided to the gas introduction space 50 of the electrochemical cell unit 41 through the inlet part 37 of the outer peripheral part 39 and used for an electrochemical reaction of the membrane electrode assembly 34. The internal gas that has been used for the electrochemical reaction is discharged to an outside as off-gas through the outlet part 38 of the outer peripheral part 39 provided at an end of each electrochemical cell unit 41 opposite to a side fixed to the attachment base part 42. Furthermore, the oxidant gas is supplied to the second electrode layer 33 of each of the electrochemical cell units 41, and the oxidant gas is discharged as off-gas after being used for an electrochemical reaction of the membrane electrode assembly 34.

The off-gas of the internal gas discharged through the outlet part 38 is mixed with the off-gas of the oxidant gas and is then converted into combustion heat by being combusted by a combustion part (not illustrated). In FIG. 2, three circular holes of approximately Φ1.5 mm are provided as the outlet part 38 for the internal gas in each of the electrochemical cell units 41. The number of holes, a hole diameter, and a hole spacing of the outlet part 38 are not limited as long as the outlet part 38 has an optimum configuration that can keep, for example, flames from being blown off and an accidental fire from occurring although the opening shape of the outlet part 38 is desirably a circular hole in consideration of combustion performance.

Although the attachment base part 42 has the fixing part 43 and the gas supply path 45, the attachment base part 42 may have only the fixing part 43 in a case where the gas supply path 45 is separately provided.

In the electrochemical cell stack 100 according to the embodiment, the mixture of off-gas obtained after power generation is diffused and combusted directly above the outlet part 38, as described above. Combustion heat heats the outer peripheral part 39 made of a metal and does not directly heat the membrane electrode assembly 34 important for power generation and therefore can contribute to an improvement in durability of the electrochemical cell units 41.

In the membrane electrode assembly 34, cone-shaped uneven displacement bulged at a central part of the membrane electrode assembly 34 or warpage, distortion, or the like between members occurs due to a difference in thermophysical property represented by a coefficient of thermal expansion among the three layers, residual stress that occurs upon sintering, deformation stress that occurs upon reduction at the first electrode layer 31 (fuel electrode layer), or the like. Each of the electrochemical cell units 41 according to the embodiment is configured such that the membrane electrode assembly 34 is fixed by the outer peripheral part 39 made of a metal and the first current collector 35 and the second current collector 40 that have elasticity. Accordingly, in each of the electrochemical cell units 41 according to the embodiment, deformation that occurs due to a difference in coefficient of thermal expansion or the like can be distributed and absorbed by the outer peripheral part 39, the first current collector 35, and the second current collector 40. Therefore, the electrochemical cell units 41 according to the embodiment can improve durability performance by reducing stress occurring on an adhesive surface of the membrane electrode assembly 34 caused by deformation occurring due to a difference in coefficient of thermal expansion or the like while protecting the membrane electrode assembly 34.

Furthermore, in the electrochemical cell stack 100, the membrane electrode assembly 34, which is a versatile flat plate type, can be used as described above, application and development and a reduction in cost can be achieved as compared with the conventional electrochemical cell units according to Patent Literatures 2 and 3 that use a cylindrical flat plate type unit having a special shape.

Modification 1

Figure 6:
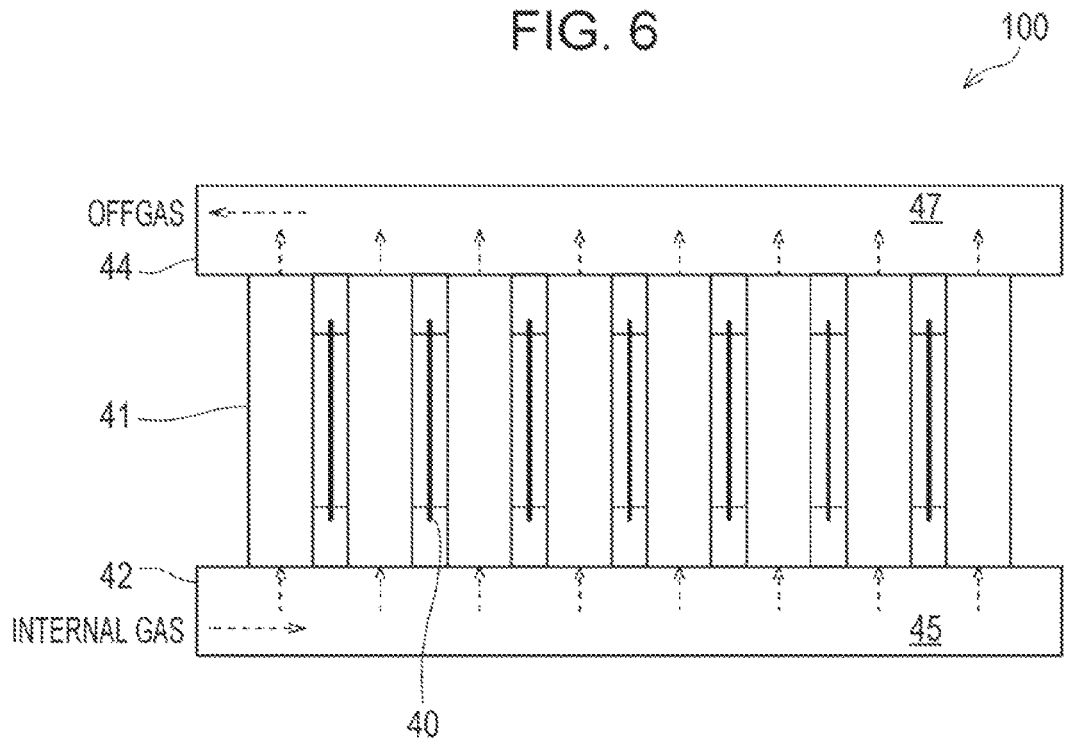
FIG. 6 is a side view illustrating an example of a configuration of an electrochemical cell unit according to Modification 1 of the embodiment of the present disclosure.
Figure 7:
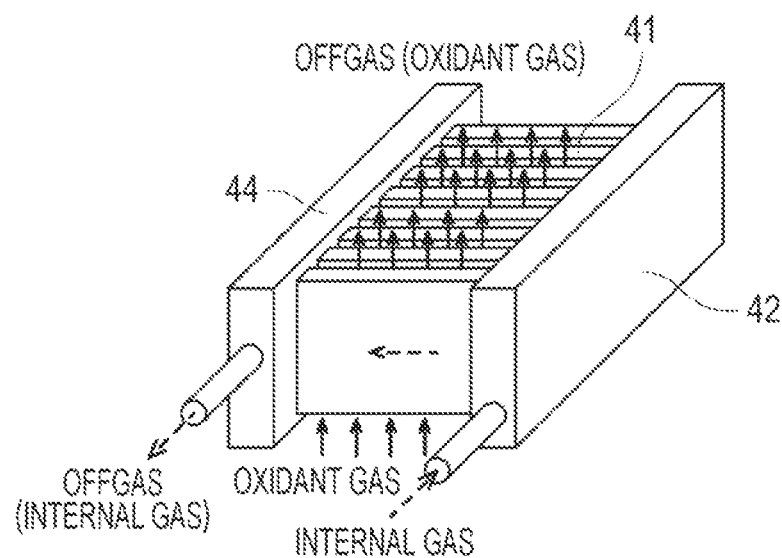
FIG. 7 is a perspective view illustrating an example of a configuration of the electrochemical cell unit illustrated in FIG. 6.
Figure 8:
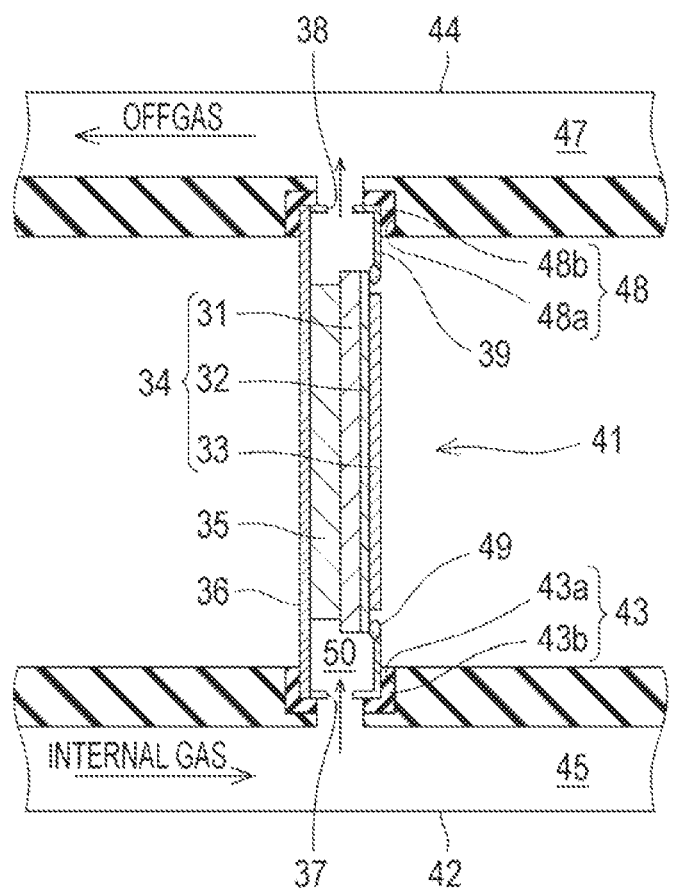
FIG. 8 is a cross-sectional view of a unit provided in the electrochemical cell unit illustrated in FIG. 6.

An electrochemical cell stack 100 according to Modification 1 of the embodiment of the present disclosure is described with reference to FIGS. 6 through 8. FIG. 6 is a side view illustrating an example of a configuration of the electrochemical cell stack 100 according to Modification 1 of the embodiment of the present disclosure. FIG. 7 is a perspective view illustrating an example of the configuration of the electrochemical cell stack 100 illustrated in FIG. 6. FIG. 8 is a cross-sectional view of an electrochemical cell unit 41 of the electrochemical cell stack 100 illustrated in FIG. 6. In FIG. 6, the broken-line arrows indicate a direction of flow of internal gas. In FIG. 7, the broken-line arrows indicate a direction of flow of internal gas and off-gas of the internal gas, and the solid-line arrows indicate a direction of flow of oxidant gas and off-gas of the oxidant gas. FIG. 8 illustrates a cross-sectional shape of the electrochemical cell unit 41 taken along line IV-IV similar to FIG. 4.

As illustrated in FIGS. 6 through 8, the electrochemical cell stack 100 according to Modification 1 further includes a gas collecting part 44 in addition to the configuration of the electrochemical cell stack 100 according to the embodiment. Note that the electrochemical cell stack 100 according to Modification 1 has a similar configuration to the electrochemical cell stack 100 according to the embodiment except for that the gas collecting part 44 is provided, and therefore similar members are given identical reference signs, and description thereof is omitted.

The gas collecting part 44 collects the internal gas discharged from a gas introduction space 50 through an outlet part 38 formed in an outer peripheral part 39 of each electrochemical cell unit 41. That is, the gas collecting part 44 is disposed at a position opposed to an attachment base part 42 and fixes the other end of each electrochemical cell unit 41 opposite to one end fixed to the attachment base part 42.

As illustrated in FIG. 8, the gas collecting part 44 has a discharge-side fixing part 48 made of an electrically insulating member in order to fix the other end of each electrochemical cell unit 41. The discharge-side fixing part 48 has a similar configuration to the fixing part 43. That is, the discharge-side fixing part 48 is constituted by a slit-shaped insertion part 48*a* formed in the gas collecting part 44 and a seal joining part 48*b* that joins a part of the electrochemical cell unit 41 inserted into the insertion part 48*a* to the gas collecting part 44. Note that at least a surface of the insertion part 48*a* that makes contact with the electrochemical cell unit 41 and the seal joining part 48*b* are made of an electrically insulating member. Examples of the seal joining part 48*b* include a glass sealing agent and a ceramic adhesive, which can achieve both electric insulation between the gas collecting part 44 and the electrochemical cell unit 41 and gas sealing. Note that although at least the surface of the insertion part 48*a* that makes contact with the electrochemical cell unit 41 among elements of the gas collecting part 44 is made of an electrically insulating member such as ceramic in the electrochemical cell stack 100 according to Modification 1, the whole gas collecting part 44 may be made of an electrically insulating member.

Furthermore, the gas collecting part 44 has a gas discharge path 47 that is communicated with the gas introduction space 50 formed by the outer peripheral part 39 through the outlet part 38 and discharges off-gas of the internal gas discharged from the gas introduction space 50. The off-gas of the internal gas discharged from the gas introduction space 50 through the outlet part 38 passes through the gas discharge path 47 and is guided to an outside of the electrochemical cell stack 100.

As illustrated in FIG. 7, the electrochemical cell stack 100 according to Modification 1 has a double-supported beam structure in which the electrochemical cell units 41 are supported by both of the attachment base part 42 and the gas collecting part 44. That is, the attachment base part 42 is provided upright on one side, and the gas collecting part 44 is provided upright on the other side, and the plurality of electrochemical cell units 41 are laid laterally across the attachment base part 42 and the gas collecting part 44.

A reason why the electrochemical cell units 41 can be supported by a double-supported beam structure in the electrochemical cell stack 100 according to Modification 1 is that the outer peripheral part 39 and the interconnector 36 of each of the electrochemical cell units 41 are made of a metal and absorbs displacement of the membrane electrode assembly 34 occurring due to a change in temperature and as a result breakage does not occur. Furthermore, according to the double-supported beam structure, both ends of each of the electrochemical cell units 41 can be fixedly supported, and therefore the electrochemical cell stack 100 according to Modification 1 can have a robust structure.

As illustrated in FIG. 7, the electrochemical cell stack 100 according to Modification 1 is configured such that the oxidant gas is distributed between the electrochemical cell units 41, the internal gas is supplied from one end of the attachment base part 42 that has a long dimension along a direction in which the electrochemical cell units 41 are laminated, and off-gas of the internal gas is discharged from one end of the gas collecting part 44 that has a long dimension along this laminating direction.

According to such a configuration, the off-gas of the internal gas discharged from the gas collecting part 44 can be guided to any position, for example, by a pipe. This makes it unnecessary to provide a combustion part directly above the outlet parts 38 of the electrochemical cell units 41, thereby increasing freedom of arrangement of the electrochemical cell stack 100 and freedom of design in a solid oxide fuel cell including the electrochemical cell stack 100.

As illustrated in FIGS. 6 and 8, in the gas introduction space 50 of each electrochemical cell unit 41, the internal gas is discharged as off-gas from the electrochemical cell unit 41 through the outlet part 38 after part of hydrogen contained therein is consumed due to an electrochemical reaction of the membrane electrode assembly 34. The discharged off-gas is dilute hydrogen gas that is mostly constituted by non-combustible components such as steam and carbon dioxide. In particular, in a case where a fuel utilization rate higher than a fuel utilization rate set for normal power generation is set, a concentration of hydrogen contained in off-gas of the internal gas decreases to be close to a combustion limit. A hydrogen concentration of the off-gas of the internal gas discharged from some electrochemical cell units 41 exceeds the combustion limit due to a variation in flow amounts of the internal gas supplied to the electrochemical cell units 41, a variation in concentration of hydrogen contained in the internal gas, or the like. Therefore, when the off-gas of the internal gas discharged from the outlet parts 38 of the electrochemical cell units 41 is combusted as it is together with off-gas of the oxidant gas, partial misfire, incomplete combustion, and the like sometimes occur.

Accordingly, in a case where a fuel utilization rate is set higher than that during normal power generation, stable heating is difficult according to a configuration in which the off-gas of the internal gas is combusted as it is directly above the outlet parts 38 and combustion heat thereof is used as a heat source for heating a reformer and others. Therefore, in a case where combustion heat of off-gas of internal gas is used as a heat source for heating a reformer and others, the system sometimes becomes unstable.

However, according to the electrochemical cell stack 100 according to Modification 1, in which the other ends of the plurality of electrochemical cell units 41 are joined to the gas collecting part 44, off-gas of the internal gas discharged through the outlet parts 38 can be gathered and made even in the gas collecting part 44 and then supplied to a combustor (not illustrated). It is therefore possible to keep stable combustion even in a case where a fuel utilization rate is set high.

Modification 2 and Simulation Analysis

Figure 9:
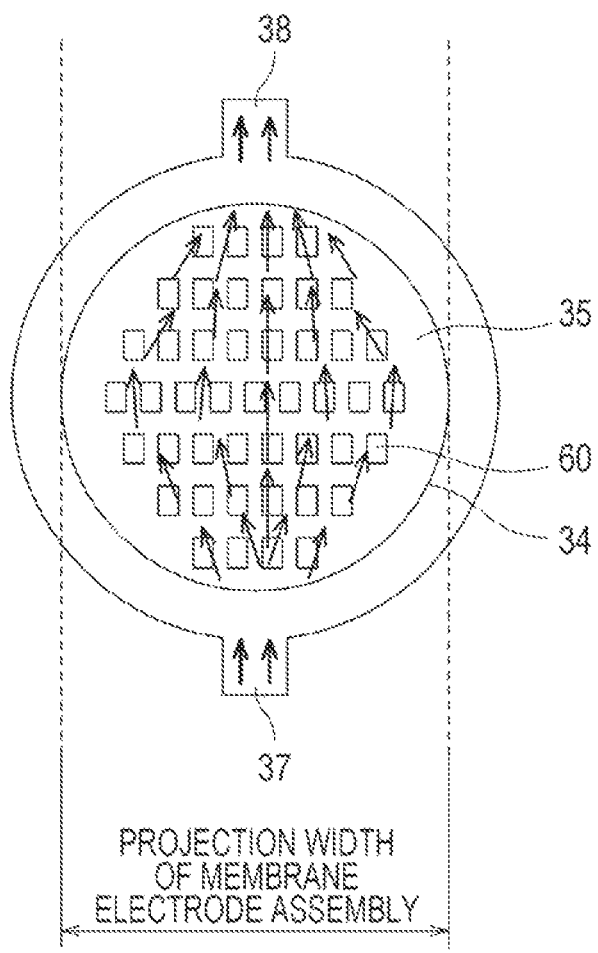
FIG. 9 schematically illustrates a cross-sectional shape of a unit provided in an electrochemical cell unit according to Modification 2 of the present disclosure and flow of internal gas.
Figure 10:
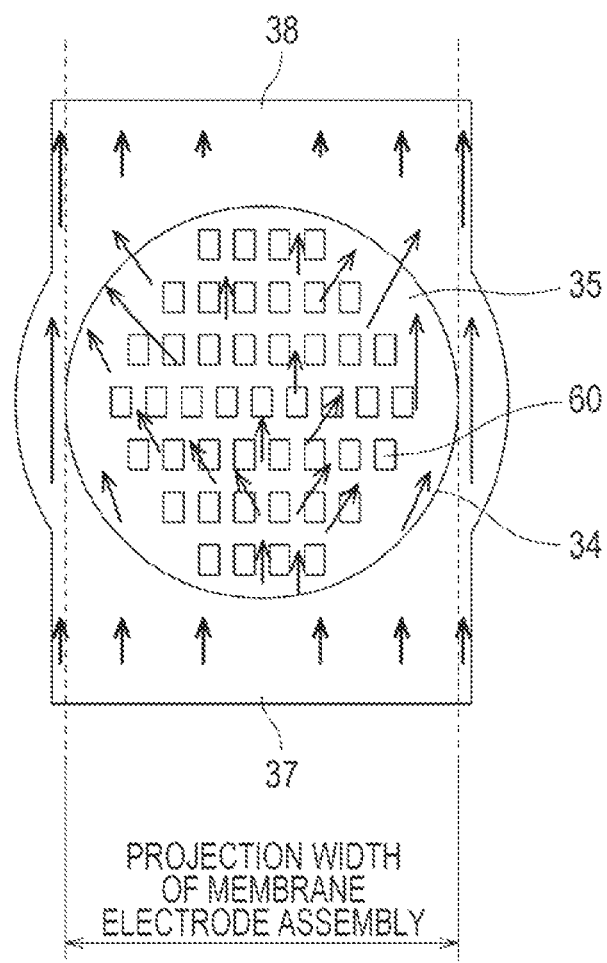
FIG. 10 schematically illustrates a cross-sectional shape of a unit having an inlet part having a different width from that in Modification 2 of the present disclosure and flow of internal gas.

An electrochemical cell stack 100 according to Modification 2 of the embodiment of the present disclosure is described with reference to FIGS. 9 and 10. FIG. 9 schematically illustrates a cross-sectional shape of an electrochemical cell unit 41 included in the electrochemical cell stack 100 according to Modification 2 of the present disclosure and flow of internal gas. FIG. 10 schematically illustrates a cross-sectional shape of an electrochemical cell unit 41 having an inlet part 37 having a width different from that in Modification 2 of the present disclosure and flow of internal gas.

FIGS. 9 and 10 illustrate a cross-sectional shape of the electrochemical cell unit 41 taken along line IX,X-IX,X in FIG. 1, and a numerical simulation result of flow of gas obtained when internal gas is supplied to the electrochemical cell unit 41 is schematically indicated by the arrows. FIG. 9 illustrates a case where opening width dimensions of the inlet part 37 and an outlet part 38 are smaller than a width (i.e., a projection width) of a membrane electrode assembly 34. Meanwhile, FIG. 10 illustrates a case where the opening width dimensions of the inlet part 37 and the outlet part 38 are larger than the width (i.e., a projection width) of the membrane electrode assembly 34 unlike Modification 2.

In FIGS. 9 and 10, a plurality of quadrangular members are arranged in the membrane electrode assembly 34. These members are cut and raised parts 60 of a first current collector 35, and at these parts, internal gas collides, is diffused, and is mixed, and a first electrode layer 31 and a first current collector 35 are electrically connected. Although the cut and raised parts 60 are disposed at even intervals and have an identical shape in FIGS. 9 and 10, this configuration is not restrictive.

A case where the membrane electrode assembly 34, which has a flat plate rectangular shape in the configuration of the electrochemical cell stack 100 according to the embodiment, has a flat plate circular shape as illustrated in FIGS. 9 and 10 has been considered. In a case where the membrane electrode assembly 34 has a flat plate circular shape, the strength can be increased as compared with the membrane electrode assembly 34 having a flat plate rectangular shape. However, in a case where the membrane electrode assembly 34 has a flat plate circular shape, internal gas passing closer to a center of the circle travels a longer distance over the first electrode layer 31 assuming that internal gas flows straight from the inlet part 37 to the outlet part 38. In such a case where internal gas flows straight from the inlet part 37 to the outlet part 38, there occur variations in distance which internal gas travels over the first electrode layer 31. This requires a configuration that enables internal gas to be distributed as evenly as possible over the first electrode layer 31. The electrochemical cell stacks 100 illustrated in FIGS. 9 and 10 are configured such that the first current collector 35 is provided with the cut and raised parts 60 to diffuse internal gas in a gas introduction space 50.

In the electrochemical cell stack 100 according to Modification 2 configured as above, the opening width dimensions of the inlet part 37 and the outlet part 38 obtained when the electrochemical cell units 41 are viewed in plan view in a laminating direction are set within a range of the projection width of the membrane electrode assembly 34 in a direction in which internal gas flows, as illustrated in FIG. 9. In other words, when the electrochemical cell units 41 are viewed in plan view in the laminating direction, the opening width dimensions of the inlet part 37 and the outlet part 38 are set so as to fall within a width dimension of the membrane electrode assembly 34 perpendicular to the direction in which the internal gas flows. Note that the direction in which the internal gas flows is a direction from the inlet part 37 toward the outlet part 38.

Meanwhile, in the electrochemical cell stack 100 having a projection width different from that in Modification 2, the opening width dimensions of the inlet part 37 and the outlet part 38 are set larger than the range of the projection width of the membrane electrode assembly 34 in the direction in which the internal gas flows, as illustrated in FIG. 10.

It has been found that a flow amount of internal gas flowing along an outer periphery of the membrane electrode assembly 34 is large and the internal gas cannot be efficiently supplied to the first electrode layer 31 in the electrochemical cell stack 100 illustrated in FIG. 10. Specifically, as a result of simulation analysis, a flow amount of the internal gas flowing through a circular part (the first electrode layer 31) was 81% of an entire flow amount, whereas a flow amount of the internal gas flowing along an outer periphery of the circular part (the first electrode layer 31) was 19% of the entire flow amount. That is, the internal gas passes not only through the first electrode layer 31 where a flow amount is needed most, but also along the outer periphery of the first electrode layer 31 having low resistance, and therefore the internal gas is not evenly supplied in the first electrode layer 31. Therefore, an efficient electrochemical reaction cannot be performed. In particular, in a case where a fuel utilization rate is set higher than that during normal power generation, hydrogen depletion occurs, which becomes a cause of malfunction.

Meanwhile, in the electrochemical cell stack 100 according to Modification 2 illustrated in FIG. 9, as a result of simulation analysis, a flow amount of the internal gas flowing through the circular part (the first electrode layer 31) was 99.2% of an entire flow amount, whereas a flow amount of the internal gas flowing along an outer periphery of the circular part (the first electrode layer 31) was 0.8% of the entire flow amount although the membrane electrode assembly 34 has a circular shape in which case the internal gas tends to flow unevenly as described above. This result shows that the internal gas can be evenly and efficiently supplied to the first electrode layer 31 by setting the opening width dimensions of the inlet part 37 and the outlet part 38 within a range of the projection width of the membrane electrode assembly 34 in a direction in which the internal gas flows. In particular, it has been revealed that the opening width dimensions of the inlet part 37 and the outlet part 38 are suitably dimensions that are equal to or less than a half of the projection width of the membrane electrode assembly 34 in the direction in which the internal gas flows and that allow a necessary amount of internal gas to flow in the gas introduction space 50.

Furthermore, a power generation experiment was conducted by mounting the electrochemical cell stack 100 according to Modification 2 in a solid oxide fuel cell. As a result of the power generation experiment, it has been revealed that power can be generated even in a case where a high fuel utilization rate (e.g., approximately 85%) is set. This is considered to be because the outlet part 38 for internal gas where a hydrogen concentration decreases most has a small opening width dimension and therefore all internal gas flowing in the gas introduction space 50 can be gathered and then discharged. This effect is obtained not only in a case where the membrane electrode assembly 34 has a circular shape, but also in a case where the membrane electrode assembly 34 has a rectangular shape or the lke.

Method for Producing Electrochemical Cell Unit

Figure 11:
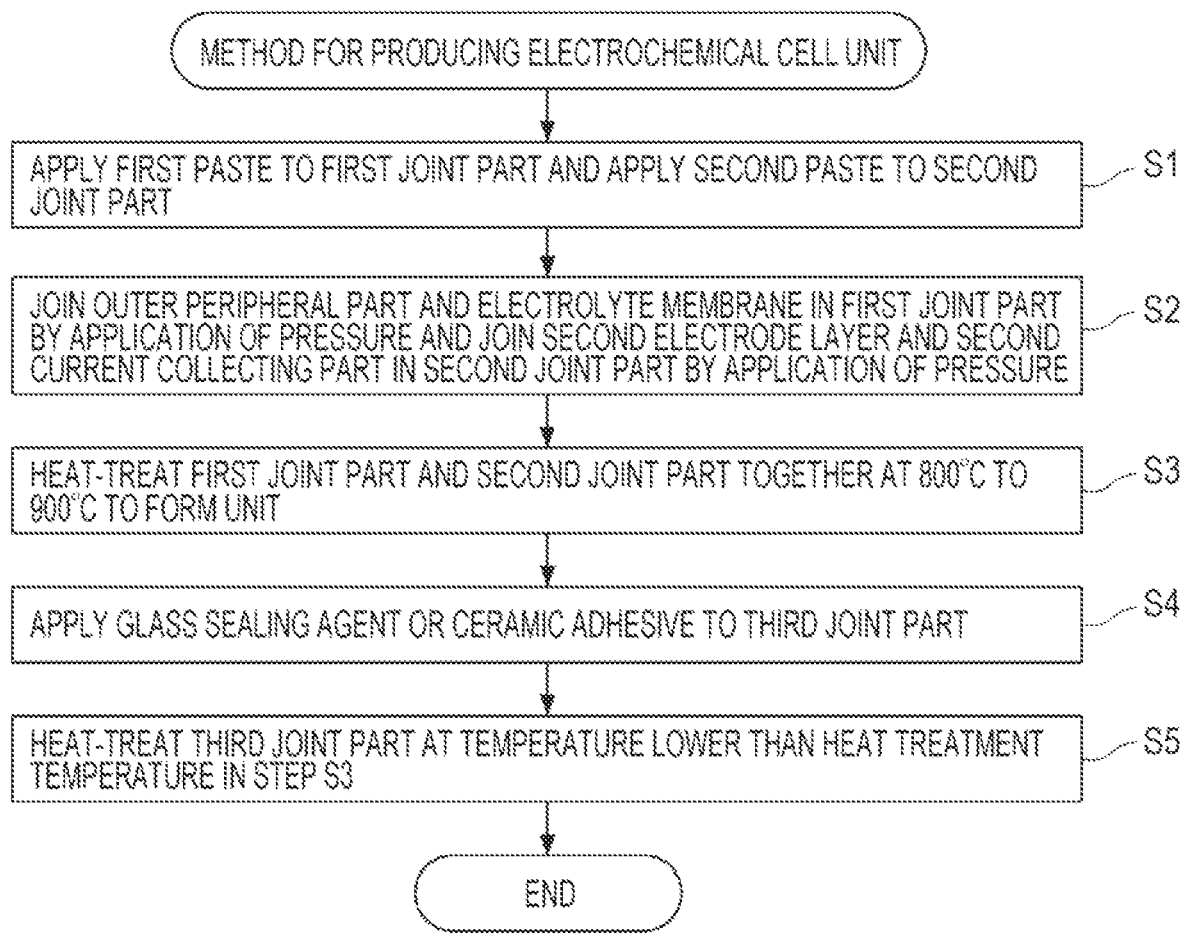
FIG. 11 is a flowchart illustrating an example of a method for producing an electrochemical cell unit according to the present disclosure.
Figure 12:
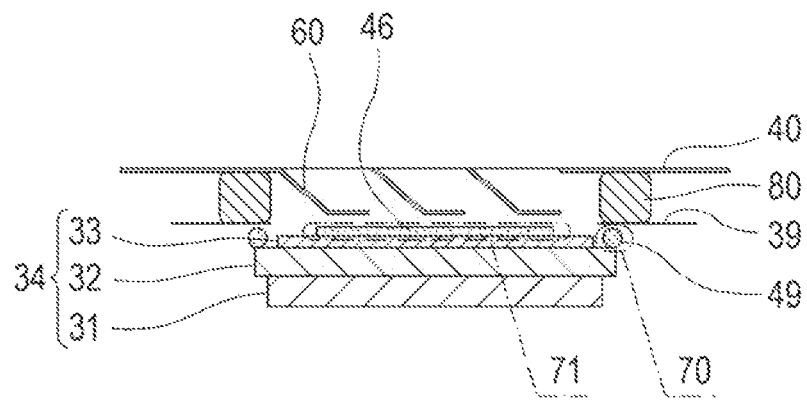
FIG. 12 schematically illustrates a process performed in step S1 illustrated in FIG. 11.
Figure 13:
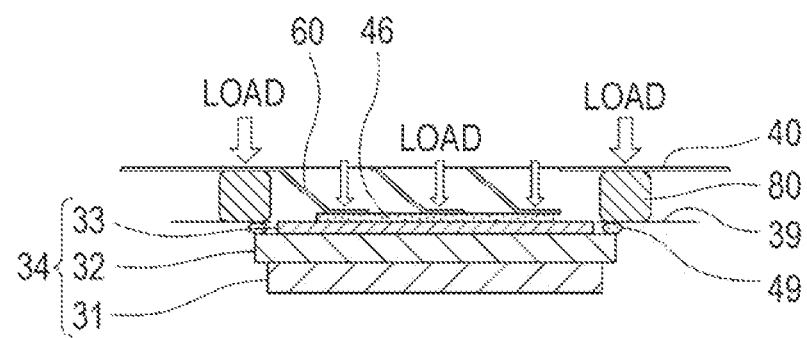
FIG. 13 schematically illustrates a process performed in step S2 illustrated in FIG. 11.

Next, an example of a method for producing the electrochemical cell stack 100 according to the embodiment is described with reference to FIGS. 11 through 13, FIG. 11 is a flowchart illustrating an example of a method for producing the electrochemical cell stack 100 according to the present disclosure. FIG. 12 schematically illustrates a process performed in step S1 illustrated in FIG. 11. FIG. 13 schematically illustrates a process performed in step S2 illustrated in FIG. 11.

As illustrated in FIGS. 11 and 12, first, the first paste 49 is applied to a first joint part 70 where the outer peripheral part 39 and a surface of the electrolyte membrane 32 that faces the second electrode layer 33 are joined, and the second paste 46 having electric conductivity is applied to a second joint part 71 where a surface of the second electrode layer 33 on which the second current collector 40 is provided and the second current collector 40 are joined (step S1). Note that the first paste 49 is any one selected from the group consisting of a glass sealing agent, a ceramic adhesive, and a silver soldering agent.

Next, as illustrated in FIGS. 11 and 13, the outer peripheral part 39 and the electrolyte membrane 32 are joined in the first joint part 70 by application of pressure, and the second electrode layer 33 and the second current collector 40 are joined in the second joint part 71 by application of pressure (step S2). As illustrated in FIG. 13, a load for joining the outer peripheral part 39 to the electrolyte membrane 32 in the first joint part 70 is applied via a spacer 80 provided between the outer peripheral part 39 and the second current collector 40 to secure a region for formation of the cut and raised parts 60 of the second current collector 40. Meanwhile, a load for joining the second electrode layer 33 to the second current collector 40 in the second joint part 71 is applied to the cut and raised parts 60 of the second current collector 40. In the state where the first joint part 70 and the second joint part 71 have been joined by application of pressure in step 32, the first joint part 70 and the second joint part 71 are heat-treated at 800° C. to 900° C. to form the electrochemical cell unit 41 (step S3).

Since the first joint part 70 and the second joint part 71 can be heat-treated together in step 33 as described above, the step can be shortened as compared with a case where the first joint part 70 and the second joint part 71 are separately heat-treated. Note that in a case where the electrochemical cell stack 100 is used in a solid oxide fuel cell, an operating temperature of the solid oxide fuel cell is approximately 600° C. to 800° C. The heat treatment temperature in step S3 is suitably set higher than the operating temperature of the solid oxide fuel cell and set equal to or lower than a temperature which stainless members constituting the interconnector 36 and the outer peripheral part 39 can withstand. That is, the first joint part 70 and the second joint part 71 are suitably heat-treated in a furnace of a temperature range of 800° C. to 900° C. (continuously for approximately 20 minutes to one hour).

After the electrochemical cell unit 41 is formed in this way, the formed electrochemical cell unit 41 is joined to the fixing part 43 (third joint part) of the attachment base part 42. That is, a glass sealing agent or a ceramic adhesive is applied in the fixing part 43 (third joint part) where the electrochemical cell unit 41 and the attachment base part 42 are joined (step S4). This fixing part 43 (third joint part) is heat-treated at a temperature lower than the heat treatment temperature (800° C. to 900° C.) in step S3 (step S5). Note that the heat treatment temperature in step S5 can be, for example, 100° C. to 200° C.

Since the temperature of the heat treatment in the fixing part 43 (third joint part) in step S5 is lower than the temperature of the heat treatment of the first joint part 70 and the second joint part 71 performed earlier in step S3 as described above, it is possible to keep the first paste in the first joint part 70 and the second paste in the second joint part from melting again during the heat treatment of the fixing part 43 (third joint part). It is therefore possible to perform the joining in the first to third joint parts with certainty.

In a case where the gas collecting part 44 is further provided as in the electrochemical cell stack 100 according to the modification, one end of the formed electrochemical cell unit 41 is joined to the fixing part 43 (third joint part) of the attachment base part 42, and the other end of the formed electrochemical cell unit 41 is joined to the discharge-side fixing part 48 of the gas collecting part 44. That is, in step S4, a glass sealing agent or a ceramic adhesive is applied in the fixing part 43 (third joint part) and the discharge-side fixing part 48. Then, in next step S5, the fixing part 43 (third joint part) and the discharge-side fixing part 48 are heat-treated together at a temperature (e.g., 100° C. to 200° C.) lower than the heat treatment temperature (e.g., 800° C. to 900° C.) in step S3.

A lot of modifications and other embodiments of the present disclosure are clear to a person skilled in the art from the above description. Therefore, the above description should be interpreted as being illustrative only and has been provided to teach a person skilled in the art the best mode for carrying out the present disclosure. Details of a structure and/or a function can be substantially changed without departing from the spirit of the present disclosure.

An electrochemical cell unit according to the present disclosure is widely applicable to an electrochemical cell stack that is constituted by a plurality of electrochemical cells such as solid oxide electrochemical cells.

What is claimed is:
1. An electrochemical cell stack comprising:
units each containing:
a flat plate type membrane electrode assembly having a structure in which an electrolyte membrane, a first electrode layer disposed on a first surface of the electrolyte membrane, and a second electrode layer disposed on a second surface of the electrolyte membrane are laminated;
a first current collector in contact with the first electrode layer of the membrane electrode assembly;
an interconnector electrically connected to the first current collector,
a second current collector in contact with the second electrode layer of the membrane electrode assembly; and
an outer peripheral part made of a metal material that surrounds an outer periphery of the first electrode layer together with the interconnector and the electrolyte membrane to form a gas introduction space for guiding internal gas to the first electrode layer, and
an attachment base part having a fixing part made of an electrically insulating member and fixes the units in which the second current collector of a first one of adjacent two of the units and the interconnector of a second one of the adjacent two of the units are electrically connected.

2. The electrochemical cell stack according to claim 1, wherein
the outer peripheral part has an inlet part through which the internal gas flows into the gas introduction space and an outlet part through which internal gas used for an electrochemical reaction of the membrane electrode assembly is discharged from the gas introduction space; and
the attachment base part has a gas supply path that is communicated with the gas introduction space through the inlet part and supplies the internal gas to the gas introduction space.

3. The electrochemical cell stack according to claim 2, further comprising a gas collecting part that collects the internal gas discharged from the gas introduction space through the outlet part.

4. The electrochemical cell stack according to claim 2, wherein
the inlet part and the outlet part of the outer peripheral part are provided symmetrically with respect to the membrane electrode assembly when the units are viewed in plan view in a direction in which the units are laminated.

5. The electrochemical cell stack according to claim 4, wherein
the membrane electrode assembly has a circular shape.

6. The electrochemical cell stack according to claim 2, wherein
opening width dimensions of the inlet part and the outlet part are within a range of a projection width of the membrane electrode assembly in a direction in which the internal gas flows.

7. The electrochemical cell stack according to claim 1, wherein
the electrically insulating member is a ceramic member.

8. The electrochemical cell stack according to claim 1, wherein
the outer peripheral part is joined to the electrolyte membrane with any one selected from the group consisting of glass, ceramics, and silver solder interposed therebetween.

9. The electrochemical cell stack according to claim 1, wherein
the metal material of which the outer peripheral part is made is stainless steel.

10. An electrochemical cell unit comprising:
a flat plate type membrane electrode assembly having a structure in which an electrolyte membrane, a first electrode layer disposed on a first surface of the electrolyte membrane, and a second electrode layer disposed on a second surface of the electrolyte membrane are laminated;
a first current collector in contact with the first electrode layer of the membrane electrode assembly;
an interconnector electrically connected to the first current collector,
a second current collector in contact with the second electrode layer of the membrane electrode assembly; and
an outer peripheral part made of a metal material that surrounds an outer periphery of the first electrode layer together with the interconnector and the electrolyte membrane to form a gas introduction space for guiding internal gas to the first electrode layer,
wherein the outer peripheral part is directly joined to the electrolyte membrane by a paste.

11. The electrochemical cell unit according to claim 10, wherein
the outer peripheral part has an inlet part through which the internal gas flows into the gas introduction space and an outlet part through which internal gas used for an electrochemical reaction of the membrane electrode assembly is discharged from the gas introduction space.

12. The electrochemical cell unit according to claim 11, wherein
the inlet part and the outlet part of the outer peripheral part are provided symmetrically with respect to the membrane electrode assembly when the units are viewed in plan view in a direction in which the units are laminated.

13. The electrochemical cell unit according to claim 11, wherein
opening width dimensions of the inlet part and the outlet part are within a range of a projection width of the membrane electrode assembly in a direction in which the internal gas flows.

14. The electrochemical cell unit according to claim 10, wherein
the membrane electrode assembly has a circular shape.

15. The electrochemical cell unit according to claim 10, wherein
the outer peripheral part is joined to the electrolyte membrane with any one selected from the group consisting of glass, ceramics, and silver solder interposed therebetween.

16. The electrochemical cell unit according to claim 10, wherein a whole periphery of the outer peripheral part is welded to the interconnector.

17. The electrochemical cell unit according to claim 10, further comprising an attachment base part having a fixing part made of an electrically insulating member,
wherein the fixing part fixes the flat plate type membrane electrode assembly, the first current collector, the interconnector, the second current collector, and the outer peripheral part as a whole to the attachment base part.

18. A method for producing the electrochemical cell unit according to claim 10, the method comprising:
applying first paste, which is any one selected from the group consisting of a glass sealing agent, a ceramic adhesive, and a silver soldering agent, to a first joint part where the outer peripheral part and a surface of the electrolyte membrane that faces the second electrode layer are joined;
applying second paste having electric conductivity to a second joint part where a surface of the second electrode layer on which the second current collector is provided and the second current collector are joined;
joining the outer peripheral part and the electrolyte membrane in the first joint part by application of pressure;
joining the second electrode layer and the second current collector in the second joint part by application of pressure; and
heat-treating the first joint part and the second joint part together at 800° C. to 900° C. to form the units.

19. A method for producing the electrochemical cell stack according to claim 1, the method comprising:
applying first paste, which is any one selected from the group consisting of a glass sealing agent, a ceramic adhesive, and a silver soldering agent, to a first joint part where the outer peripheral part and a surface of the electrolyte membrane that faces the second electrode layer are joined;

applying second paste having electric conductivity to a second joint part where a surface of the second electrode layer on which the second current collector is provided and the second current collector are joined;

joining the outer peripheral part and the electrolyte membrane in the first joint part by application of pressure;

joining the second electrode layer and the second current collector in the second joint part by application of pressure;

heat-treating the first joint part and the second joint part together at 800° ° C. to 900° C. to form the units;

applying a glass sealing agent or a ceramic adhesive to a third joint part where the units formed in the heat-treating and the attachment base part are joined; and heat-treating the third joint part at a temperature lower than the temperature for the heat treatment in the heat-treating.

\* \* \* \* \*